United States Statutory Invention Registration [19]

[11] Reg. Number: H423

Mohon et al.

[43] Published: Feb. 2, 1988

[54] FRESNEL LENS IN AN IMPROVED INFINITY IMAGE DISPLAY SYSTEM

[75] Inventors: Windell N. Mohon, Athens, Ala.; Wiley V. Dykes, Winter Park, Fla.; Arthur Cox, Park Ridge, Ill.

[73] Assignee: The United States of America as represented by the Secretary of the Navy, Washington, D.C.

[21] Appl. No.: 380,171

[22] Filed: May 20, 1982

[51] Int. Cl.[4] ..... G02B 3/08

[52] U.S. Cl. ..... 350/452

[58] Field of Search ..... 350/451, 452, 292, 276 R

[56] References Cited

U.S. PATENT DOCUMENTS

| | | | |
|---|---|---|---|
| 2,751,816 | 6/1956 | Strong | 350/292 |
| 3,623,789 | 11/1971 | Kawazu et al. | 350/452 |
| 3,784,282 | 1/1974 | Yamazaki et al. | 350/452 |
| 4,391,495 | 7/1983 | Mazurkewitz | 350/452 |

OTHER PUBLICATIONS

Cox, Application of Fresnel Lenses to Virtual Image Display, 8/1978, SPIE, vol. 162.

*Primary Examiner*—Stephen C. Buczinski
*Assistant Examiner*—Linda J. Wallace
*Attorney, Agent, or Firm*—Robert F. Beers; Robert W. Adams; Robert J. Veal

[57] ABSTRACT

A fresnel lens employs a design that reduces the transmission of stray light to a viewer located at its entrance pupil, said design requiring directional undercutting of selected facets of the lens so as to align the directionally undercut nonimaging surface parallel to the viewer's line of sight. The facets of the lens are arcuately shaped to yield a closer approximation to a glass lens. The lens is of particular use in a visual image display system.

4 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FRESNEL LENS IN AN IMPROVED INFINITY IMAGE DISPLAY SYSTEM

FIELD OF THE INVENTION

The present invention relates to the field of optics and more particularly to the aspect of the field of optics dealing with lenses particularly in multiple lens systems. In greater particularity, the present invention relates to fresnel lenses used in a virtual image display system. By way of further particularization, the present invention can be described as a fresnel lens employing curved facets which are selectively undercut to improve optical clarity in a Virtual Image Display System.

DESCRIPTION OF THE PRIOR ART

Fresnel lenses are well known in the art. Such a lens typically has one or both of its faces formed into annular grooves such that a thin lens has the optical characteristics of a thick lens. Fresnel lenses can be useful in reducing optical aberrations; however, the discontinuaties of the lens surface cause optical problems of its own, particularly when the lens is a part of a system which requires a viewer to continuously look at an image transmitted through the system, such as a flight simulator. Virtual image display systems are required in many aircraft flight simulators to enable the pilot trainee to observe the runway or target at an apparently infinite distance. Heretofore, the virtual image displays for flight simulators have been provided by several means including glass refractive lens systems, mirror beam splitter systems, and Pancake Window TM (trademark of Ferrand Optical Co., Inc.) systems. The refractive lens systems have excellent optical transmission characteristics but are very heavy and cumbersome, thus limiting their effectiveness in movable platform flight simulators.

Both the Pancake Window TM and mirror beam splitter type displays suffer from very low optical transmission characteristics.

SUMMARY OF THE INVENTION

The present invention overcomes the problems associated with the above systems by using fresnel lenses arranged in a very lightweight system to present a virtual image to the viewer with little optical distortion and highly acceptable optical transmission characteristics. The novel lenses have directionally undercut facets in selected regions to reduce the non-refractive area of the lens. The fresnel lenses also have curved facets in order to more clearly approximate the effect of common glass lenses. Both the directionally undercut facets and the curved facets are made possible by the new technology of diamond turning of soft optical materials, such as plastic.

OBJECTS OF THE INVENTION

It is an object of the invention to improve the transmission of light through a virtual image display system.

It is another object of the invention to provide a light-weight lens system consonant with the first stated object.

It is yet another object to provide a fresnel lens with enhanced image contrast by lowering the transmission of excess light from non-image forming surfaces.

These and other objects and new features of the invention will be apparent to the artisan from a study of the description of a preferred embodiment and the accompanying drawings.

THE DRAWINGS

FIG. 1 illustrates a plastic fresnel lens having curved and directionally undercut facets; and FIG. 2 represents a virtual image display system embodied in an expanded form.

DESCRIPTION OF A PREFERRED EMBODIMENT

The typical fresnel lens employs a series of annular facets of varying inclination, each facet being connected to the adjacent facet by a nonimage forming surface which is normally parallel to the optical axis of the lens. In some instances, such as U.S. Pat. No. 2,547,416 to A. M. Skellett, the nonimage forming surface is inclined counter to the inclination of the facets.

In a system requiring large area lenses, such as a Virtual Image Display for a flight simulator, it soon becomes apparent that the nonimage forming surfaces between each pair of facets of the lens present a reflecting surface or a transmitting surface which disrupts the orderly transmission of light through the lens by transmitting unwanted light in the image area. The unwanted light from the annular surfaces is quite distrcting, lowers contrast, and reduces the realism of the simulator environment.

Attempts have been made to reduce the light from said nonimage forming surfaces by coating said surfaces with an opaque substance; however, the results have not been satisfactory.

The present lens employs a novel undercutting design to reduce the amount of light reaching the viewer from said nonimage forming source.

Figure 1:
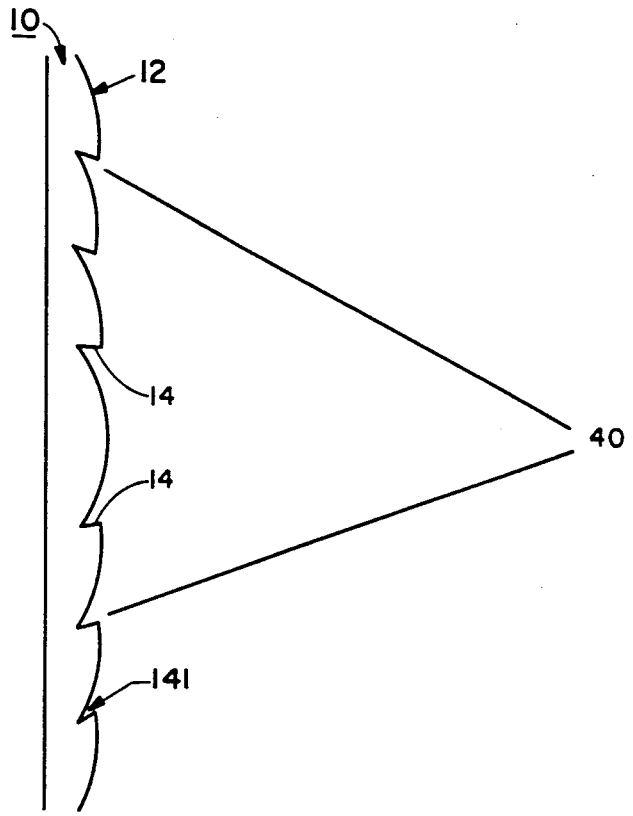

FIG. 1 represents a fresnel lens 10 having a series of inclined facets 12, which are inclined at various angles to focus light across the lens face to a single exit pupil. Between each pair of facets 12 is a nonimage forming surface 14. The nonimage forming surfaces 141 between the outermost facets are directionally undercut so that the surface 141 is parallel to the surface of a cone having its apex at a viewpoint 40 which represents the viewer's station and exit pupil of the lens. Since nonimage forming surface 141 is parallel to the line of sight of the viewer, a minimum amount of light will be transmitted from surface 141 to the viewer, thus substantially all of the light reaching the viewer from the lens 10 will be light refracted by facets 12.

The directional undercutting of nonimage forming surfaces 141 also serves to lengthen facets 12, thus yielding greater refractive area and almost entirely eliminating optical obscuration. Facets 12 are also arcuately shaped, by a process of diamond turning, to match the curvature of a common glass lens of the same index of refraction. Introducing the curvature to facets 12 reduces spherical aberration by a factor of two over prior fresnel lenses and results in a fresnel lens which is almost optically the same as a glass lens. Both directional undercutting and facet shaping are made possible by using a material, such as plastic, which can be diamond turnd on a very accurate lathe system.

In practive, a numerically controlled lathe is used to form the lens. The procedure is to calculate the slope of the facets at the beginning of each facet cut. This slope is used to calculate the depth of the cut at the end of the facet. The proper fresnel coefficients are thus obtained for the bottom of the groove for the particular facet.

Using these coefficients, the appropriate slope is calculated for the end of the facet cut. Intermediate values of the slope angle between the beginning and end of a facet are obtained by linear interpolation. These calculated and interpolated slope angles are then used to control the precision lathe.

A Virtual Image Display System (VIDS) has been devised using the novel lightweight plastic fresnel lenses 10. The VIDS is for use in a flight simulator and, as in most simulators, an image from a CRT is projected to the trainee, said CRT image being dependent on the interaction of the simulated aircraft controls and a host computer. The host computer simulates the particular aircraft response to the controls and outputs signals to the simulator platform controls and visual display.

Figure 2:
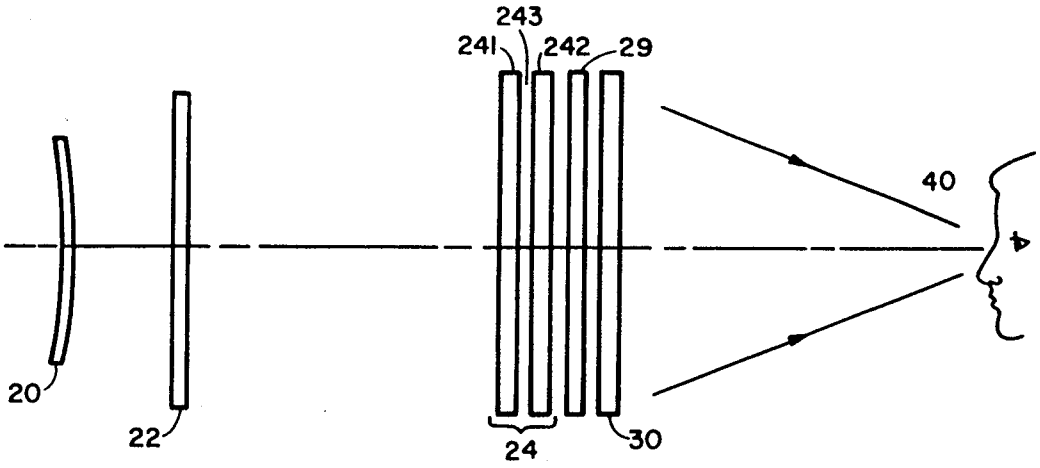

Referring to FIG. 2, light data from a CRT 20 passes through a first fresnel lens 22 which acts primarily as a field flattener. The light data then passes through a lens combination 24 which has two fresnel lens elements 241 and 242 whose facets face inward. The space between elements 241 and 242 is filled with a liquid 243 whose index of refraction is higher than that of the material of the fresnel lens elements 241 and 242. This effectively produces a negative fresnel lens which greatly aids in chromatic aberration correction.

The light data then passes through positive fresnel lenses 29 and 30. All of the fresnel lenses are manufactured according to the present design. The result is full color, collimated infinity image display proceeding toward the viewer with a very good contrast ratio, and having all of its optical aberrations reduced to a very acceptable level. The entire optical system is extremely compact and lightweight and has an optical transmission exceeding 85%.

It is to be understood that the description and drawings contained herein are to be considered merely as illustrative of the present invention and not as limitations, as many modifications and adaptions may be made without departing from the scope and principles of the invention as set forth in the appended claims.

What is claimed is:

1. A lens of the fresnel type, having a single focal point, said lens haing on one surface a series of fresnel steps forming a series of facets concentric about the optical axis of said lens, each facet having an arcuate face and an innermost and outermost edge, said arcuate face being formed by determining the slope of said facet at said innermost and outermost edge and forming said facet such that a smooth curvilinear surface intersects said innermost and outermost edge at slopes coinciding thereto; said lens further having non-image forming surfaces connecting adjacent facets thereof, said non-image forming surfaces being directionally undercut beneath selected facets such that said non-image forming surface is aligned parallel to the line of sight of a viewer observing an image projected therethrough and thereby extending the length of the adjacent facet.

2. A lens according to claim 1, wherein facets selected for directional undercutting are located in regions of said lens having the lowest percentage of light transmitted through the focal point of said lens.

3. A lens according to claim 1, said lens being made from a material which can be diamond turned.

4. An improved virtual image display system for projecting light data having a field flattening fresnel element for receiving said light data, a liquid filled lens combination of two fresnel elements effectively producing a negative fresnel lens receiving light data from said field flattening element, a fourth fresnel element transmitting light received from said lens combination, and a fifth fresnel element transmitting light received from said fourth fresnel element, wherein the improvement comprises:

a plurality of lenses according to claim 3, each for use as a fresnel element in said virtual image display system, each lens having its non-image forming surfaces selectively aligned parallel to the propagation of light through the system.

* * * * *